United States Patent [19]

Brummel et al.

[11] Patent Number: 5,607,219
[45] Date of Patent: Mar. 4, 1997

[54] HEADLIGHT FOR MOTOR VEHICLE

[75] Inventors: Reinhold Brummel, Anroechte; Berthold Doering, Werl; Thomas Niedenzu, Oelde, all of Germany

[73] Assignee: Hella KG Hueck & Co., Lippstadt, Germany

[21] Appl. No.: 507,195

[22] Filed: Jul. 26, 1995

[30] Foreign Application Priority Data

Aug. 11, 1994 [GB] United Kingdom ............ 44 28 438.1

[51] Int. Cl.$^6$ ..................................... B60Q 1/00
[52] U.S. Cl. ..................... 362/61; 362/307; 362/359; 362/361
[58] Field of Search ............... 362/61, 66, 268, 362/282, 331, 322, 307, 89, 300, 235, 247, 299, 346, 359, 361, 351

[56] References Cited

U.S. PATENT DOCUMENTS

| | | | |
|---|---|---|---|
| 4,855,877 | 8/1989 | Otaka | 362/61 |
| 4,868,726 | 9/1989 | Segoshi | 362/61 X |
| 5,001,610 | 3/1991 | Otaka | 362/61 |
| 5,021,930 | 6/1991 | Yamada | 362/61 |
| 5,083,243 | 1/1992 | Paulat et al. | 362/300 X |
| 5,117,335 | 5/1992 | Yamada | 362/61 |
| 5,172,972 | 12/1992 | Terao | 362/61 X |

FOREIGN PATENT DOCUMENTS

| | | |
|---|---|---|
| 0054444B1 | 7/1983 | European Pat. Off. . |
| 0129922 | 1/1985 | European Pat. Off. . |
| 2621100 | 3/1989 | France . |
| 2649368 | 1/1991 | France . |
| 2657148 | 7/1991 | France . |
| 3415442A1 | 10/1984 | Germany . |

*Primary Examiner*—Ira S. Lazarus
*Assistant Examiner*—Thomas M. Sember
*Attorney, Agent, or Firm*—Griffin, Butler, Whisenhunt & Kurtossy

[57] ABSTRACT

A headlight for a vehicle has a pot-shaped housing (1) which is closed at its front side by a light-transmissive shield (2). A reflector (4, 13) is mounted in an interior space formed by the light-transmissive shield and the housing. An opaque shield (5) covers at least a partial area between the light-transmissive shield and the reflector and at least a portion thereof is formed of an outer sidewall portion (6) of the reflector-receiving housing which is inwardly-drawn to extend toward an interior of the headlight.

8 Claims, 2 Drawing Sheets

5,607,219

HEADLIGHT FOR MOTOR VEHICLE

BACKGROUND OF THE INVENTION

This invention relates to a headlight for a motor vehicle having a pot-shaped housing, a light-transmissive shield (windshield) mounted on a front edge of a sidewall of the housing, a reflector mounted in the pot-shaped housing and an opaque screen which covers, or blocks, at least a partial area between the light-transmissive shield and the reflector.

European Patent Publication 0 054 444 discloses two headlights for motor vehicles each of which includes generally a plastic pot-shaped housing, a bowl-shaped light-transmissive shield covering an open front side of the pot-shaped housing, an adjustable reflector mounted in the interior of the headlight, and an opaque screen extending between the light-transmissive shield and the reflector. The opaque screen is a collar which is on the front edge of the pot-shaped housing for extending into an interior of the bowl-shaped light-transmissive shield and whose outer free edge then extends toward a front edge of the reflector. In one of the headlights it is quite beneficial that the collar is formed as one piece with the housing; however, it must be formed by a mold piece, or die, which is removed from a rear housing opening. Thus, the pot-shaped housing has a cylindrical shape with an entire floor, or back, of the housing being formed by a cover mounted on a sidewall of the housing, which cover has a centrally positioned opening through which a lamp, which is placed in the reflector, is accessible. The housing cannot, because of its cylindrically-shaped sidewall, closely surround the reflector and can then be too large for the often very small space in a motor-vehicle chassis. These disadvantageous are overcome by the other headlight by having the collar constructed as a separate part. When this is done, the entire interior of the pot-shaped housing can be formed by a mold part, or die, removed through the opening at the front side of the housing so that the housing can closely surround the reflector and can have a smaller housing opening. The collar must, because it is a separate part, be separately manufactured and mounted.

It is an object of this invention to provide a vehicle headlight of the type described in the opening paragraph above in which an opaque screen can be formed as one piece with a housing even though a mold die for forming a surface portion of the opaque screen is not removed through a rear housing opening but through the open front side of the housing.

SUMMARY OF THE INVENTION

According to principles of this invention, at least a portion of the opaque screen is formed of an outer sidewall portion of the reflector-receiving housing which is drawn inwardly to extend toward an interior of the headlight.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
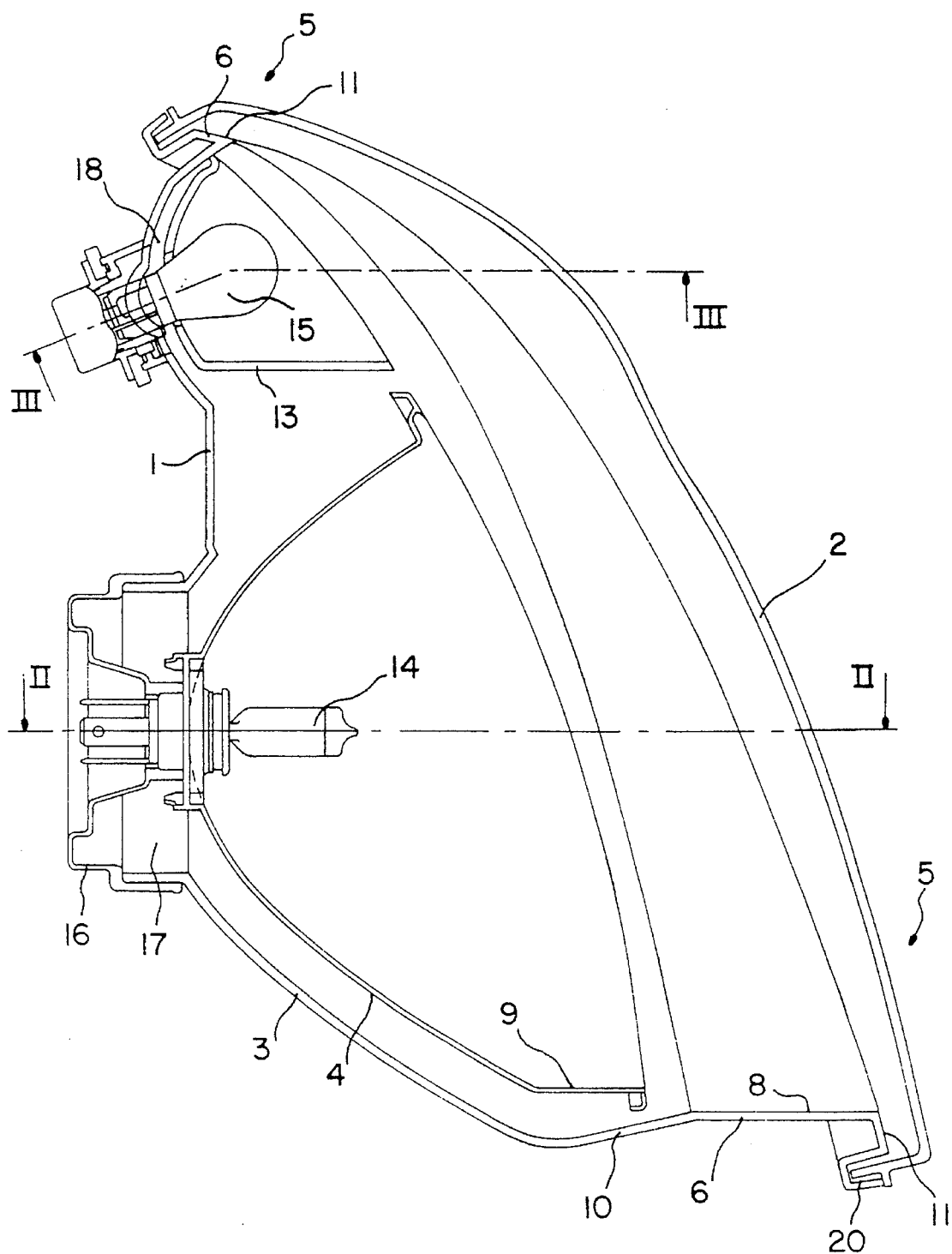
FIG. 1 is a center, horizontal, lengthwise, cross section of a headlight for a vehicle with an opaque screen of this invention extending between an outer light-transmissive shield, there being two reflectors mounted in a pot-shaped housing.
Figure 2:
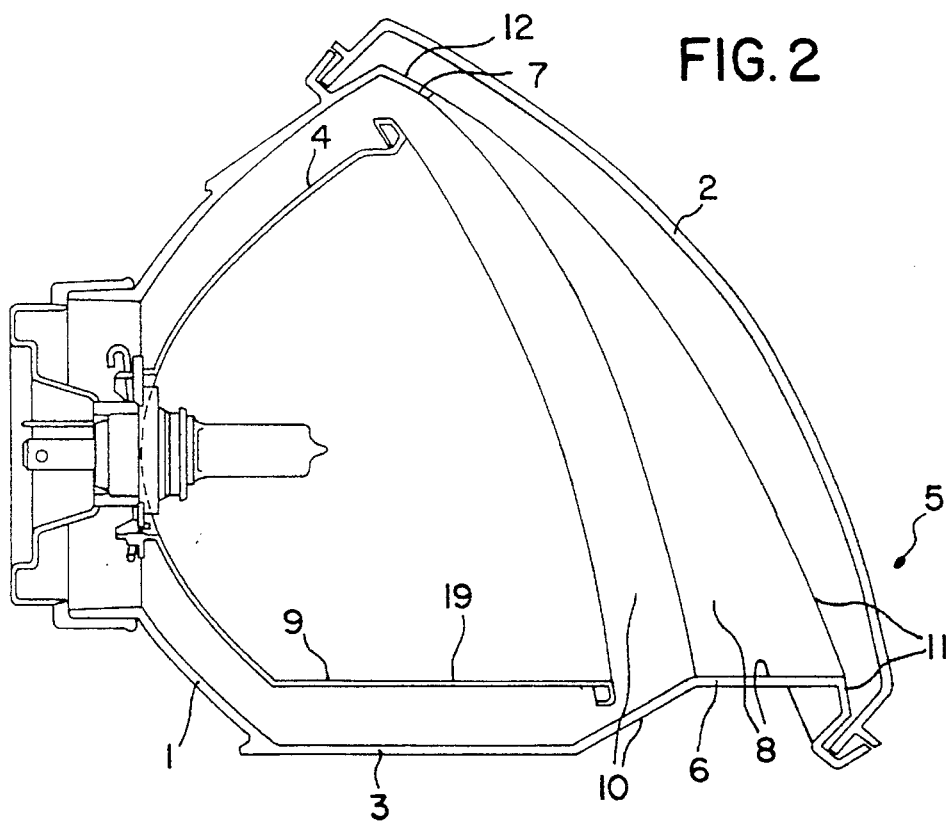
FIG. 2 is a mirror image of a cross section taken on line II—II in FIG. 1.
Figure 3:
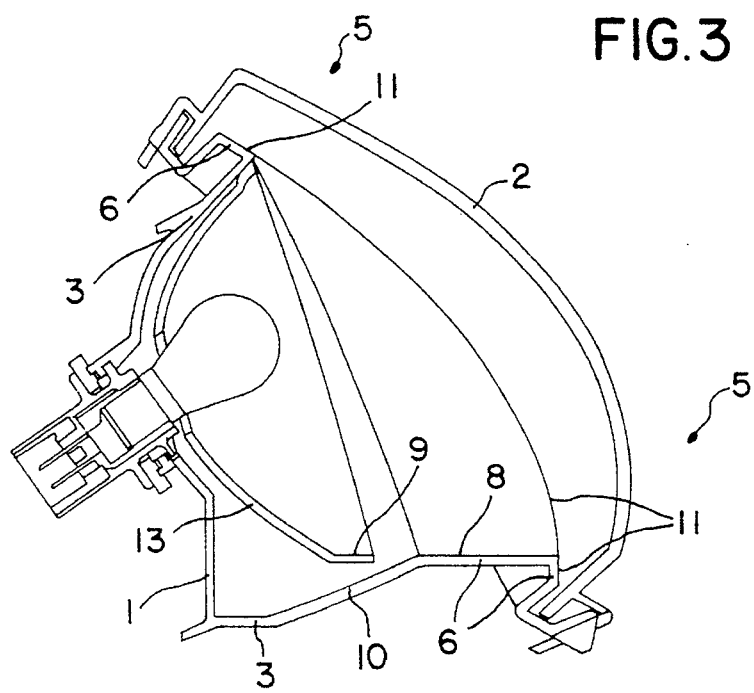
FIG. 3 is a cross section taken on line III—III in FIG. 1.

A headlight for a motor vehicle has a pot-shaped housing 1 manufactured of resinous plastic and a light-transmissive shield 2 mounted on an outer front edge of the housing's surrounding sidewall 3. An adjustable reflector 4 and a fixed reflector 13, for providing side light to a vehicle, are mounted in an interior defined by the light-transmissive shield 2 and the pot-shaped housing 1. The reflectors 4, 13 are arranged, laterally adjacent one another. A front side of the light-transmissive shield 2 extends, starting from an edge of the reflector 4 directed away from the reflector 13, toward the fixed reflector 4 in a direction toward the rear of the headlight, and, starting from its bottom edge, inclined at an angle toward the rear of the headlight. Because of this orientation of the front side of the light-transmissive shield 2, and thereby of the outer surrounding edge of the housing 1, the top front edges of both reflectors 4, 13 extend close to an upper edge of the housing while lower front edges of both reflectors 4, 13 are arranged to lie deeper in the housing 1, with a rising outer sidewall portion 6 of the housing 1 thereby extending between their front lower edges and the light-transmissive shield 2. Also, the outer sidewall portion 6 of the sidewall 3 of the housing 1 which is adjacent the adjustable reflector 4 extends above the adjacent front edge of the reflector 4 while the sidewall portion 6 of the housing 1 which is adjacent the front edge of the fixed reflector 13 extends to be close to the front edge of the reflector 13. The pot-shaped housing 1 closely surrounds the reflectors 4, 13 and is thereby as small as possible. An opening for receiving a lamp 14, 15 is arranged in each of the bowl-shaped reflectors 4, 13 at their apexes. The lamp 14 is attached to the reflector 4 and its socket extends through a centrally-positioned opening of a rubber sleeve 16, whose outer surrounding edge is mounted on a collar defining a housing opening 17. The lamp 15 for the reflector 13 extends through the opening of the reflector 13 and its socket is releasably attached in a housing opening 18. The housing openings 17, 18 are of sizes that it is possible to simply and easily change the light bulbs therethrough.

The outer sidewall portion 6 of the housing 1 at the bottom of the headlight, and at the side of the headlight adjacent the adjustable reflector 4, which extends above the front edges of the reflectors 4, 13 in a light-exiting direction, is drawn in toward the interior of the headlight, perpendicular to the light-exiting direction, but then extends to the front side of the light-transmissive shield. In this regard, the inwardly-drawn outer sidewall portion 6, in the interior of the headlight, has a first surface portion 8 which extends, substantially parallel to the light-exiting direction, nearly to the front edge of the reflectors and to be substantially flush to adjacent interior surfaces 9 of the reflectors 4, 13. The inwardly-drawn sidewall portion 6 has a second surface portion 10 adjacent the first surface portion 8 which extends towards the rear side of the headlight and a third surface portion 11 which extends toward the front side of the light-transmissive shield 2. The second surface portion 10 extends at an acute angle to the light-exiting direction which opens toward the rear side of the headlight so that segments thereof lie in planes which extend through the open side of the housing. The adjustable reflector 4 extends to be slightly spaced from the second surface portion 10 while a front edge of the fixed reflector 13 lies on the second surface portion 10 of the sidewall portion 6. The adjustable reflector 4 has a horizontally extending, large, lower, flat area 19 which extends in a horizontal plane substantially together with, or substantially parallel to, the adjacent first surface portion 8 of the outer sidewall portion 6. The third surface portion 11 extends substantially at a right angle to the first surface portion 8 of the sidewall portion 6 and extends to the free edge of the outer sidewall portion 6 for receiving the light-transmissive shield 2. The outer free edge of the sidewall portion 6 has a U-shaped receiving seat 20 for the light-transmissive shield 2.

The outer sidewall portion 6 of sidewall 3 of the housing 1, which is positioned laterally and upwardly adjacent to the fixed reflector 13, is drawn to extend exclusively to the front side of the light-transmissive shield 2 and has the third surface portion 11 thereon which is directed towards the front side of the light-transmissive shield 2. The upper front edge of the reflector 13 is adjacent and near to the third surface portion 11 at the drawn outer sidewall portion 6 of the housing 1.

The housing 1 of the headlight has a collar 7 formed at its front edge above the adjustable reflector 4 whose free edge portion is directed toward the bottom front edge of the housing 1. This forms a fourth surface portion 12.

Thus, an opaque-screen portion 5 of the outer sidewall portion of the housing supports the light-transmissive shield at its free edge. Further, the opaque screen 5 can be made to be as wide as desired. The wider the opaque screen is made, and the deeper that the outer sidewall portion is drawn into the headlight, the smaller is the interior space of the headlight. In this manner, the inwardly-drawn extending sidewall portion can have a wide outer rim that can extend into a channel of a chassis part and/or attaching element of the headlight. Further, less raw material is necessary to manufacture the housing because the opaque screen that is formed by the outer sidewall of the housing is self made. Further, the housing is, at its front free edge, because of the inwardly-drawn extending outer sidewall portion, relatively stiff so that the light-transmissive shield which is mounted on the housing need not contribute a manipulation stiffness to the headlight and can be of thin-wall plastic.

It is beneficial, for a headlight with a deep housing, that the inwardly-drawn wall portion of the housing extends over the front edge of the reflector in the light-exiting direction and extends, inwardly drawn, perpendicular to the light-exiting direction toward the interior of the headlight and that a first surface area thereof, that is directed toward the interior of the headlight, is substantially flush with an adjacent interior surface of the reflector. With such an embodiment, the opaque screen can also conceal a large spacing between the light-transmissive shield and the reflector.

In this regard, it is further beneficial that a second surface portion of the inwardly-drawn sidewall portion directed toward the interior of the headlight extends toward the rear side of the headlight and lies in planes that pass through the front side of the housing. With such an arrangement the inner surfaces of the first and second surface portions of the opaque screen can be formed by molding dies which can be removed without additional adjustable molding die parts being necessary. The outer surface portions of the inwardly-drawn outer sidewall portion can, without problems, have its molding tool removed along with a molding tool which forms an outer surface of the pot-shaped housing.

The free edge of the sidewall of the housing which receives the light-transmissive shield can, in a beneficial manner, be screened by the opaque screen if it is formed by an outer sidewall portion of the housing extending inwardly from the front side of the light-transmissive shield and has a third surface portion facing the front side of the headlight. In this regard, it is beneficial that the third surface portion changes over into a fourth surface portion of a collar formed on the front edge of the sidewall of the housing. Thus, because of the third and fourth surface portions a ring-shaped opaque screen is developed encircling the reflector.

In a headlight in which a front side of a light-transmissive shield extends upwardly at an angle toward a rear side of the headlight and extends laterally at an angle toward the rear side of the headlight, it is further beneficial that the inwardly-drawn outer sidewall portion is mounted in a lower, or at least lateral sidewall. In such a headlight, an interior side of an opaque screen formed by the inwardly-drawn outer sidewall portion can be removed from a mold die which forms the interior surface of the housing without problems. Also, the collar can be removed from this mold die if the collar is formed on the front edge of the top side wall of the housing and its free edge is directed toward an oppositely front edge of the housing. Such a collar can be relatively easily removed from an adjustable molding tool which is supported by the mold die which forms the interior of the housing.

In a headlight whose reflector is attached to be rotatable about a horizontal axis, the reflector can be simply and easily mounted in the housing if the horizontal axis extends in an upper half of the headlight and an attachment is formed of two interconnecting elements for the housing which have two self guiding, interengaging parts; because the reflector, after a self guiding coupling of the upper half of the reflector with the housing, is pivotal in the housing without colliding with the opaque screen created by the inwardly drawn portion.

The inwardly-drawn opaque screen can also closely extend about a plurality of adjacently arranged reflectors. When this is done, a front edge of an adjustable reflector should be spaced from first and second surface portions of the inwardly-drawn outer sidewall portion, while a front edge of a fixed reflector can lie against a surface portion of the inwardly-drawn sidewall portion.

The invention claimed is:

1. A headlight for a vehicle comprising: a one piece pot-shaped housing, said pot-shaped housing having a sidewall extending from a rear-side lamp receiving opening to a light-transmissive shield mounted at a receiving seat formed on a front edge of the sidewall of the housing; and a reflector mounted in the pot-shaped housing; wherein all opaque screen for blocking at least a partial area between the light-transmissive shield and the reflector is formed of a drawn-in portion of the sidewall of the housing which is displaced inwardly, relative to an adjacent portion of the sidewall nearer said lamp receiving opening, toward an interior of the headlight; and wherein said receiving seat is formed on a drawn-out portion of the sidewall, positioned between the drawn-in portion and the front edge of the sidewall of the housing, displaced outwardly from the drawn in portion of the sidewall, away from the interior of the headlight.

2. A headlight as in claim 1 wherein the drawn-in portion of the sidewall has a first surface portion which faces inwardly toward the interior of the headlight and which is substantially flush with an adjacent interior surface of the reflector.

3. A headlight as in claim 1 wherein the drawn-in sidewall portion has a second surface portion which faces the interior and rear side of the headlight and which lies in planes which pass through a front side of the housing.

4. A headlight as in claim 1 wherein the drawn-in sidewall portion of the housing has a third surface portion which extends toward the front side of the light-transmissive shield and is directed toward the front side of the headlight.

5. A headlight as in claim 4 wherein the third surface portion changes into a fourth surface portion of a collar formed on the front edge of the sidewall of the housing.

6. A headlight as in claim 1 wherein a bottom sidewall of the housing is formed as one piece with the drawn-in portion of the sidewall.

7. A headlight as in claim 6 wherein the reflector is pivotable about a horizontal axis and wherein the horizontal axis extends in an upper half of the headlight and is formed of two coupling elements with the housing which have two self interengaging coupling elements.

8. A headlight as in claim 1 wherein there are a plurality of reflectors and wherein the drawn-in portion of the sidewall extends closely adjacent to each of the plurality of reflectors.

* * * * *